United States Patent
Butron Luz et al.

(10) Patent No.: US 11,192,437 B1
(45) Date of Patent: Dec. 7, 2021

(54) VEHICLE LOAD MANAGEMENT SYSTEM AND METHOD

(71) Applicant: Ford Global Technologies, LLC, Dearborn, MI (US)

(72) Inventors: Edgar Butron Luz, Lerma de Villada (MX); Vinaya Rachala, Canton, MI (US); Conor Hennessey, Dearborn, MI (US); Bhimaraddi Venkaraddi Alavandi, Canton, MI (US); Vladimir Vladimirovich Bogachuk, West Bloomfield, MI (US); Harsha Kusnoorkar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 22 days.

(21) Appl. No.: 16/937,304

(22) Filed: Jul. 23, 2020

(51) Int. Cl.
| | |
|---|---|
| *B60K 1/04* | (2019.01) |
| *B62D 21/02* | (2006.01) |
| *B62D 25/08* | (2006.01) |
| *B62D 21/09* | (2006.01) |
| *H01M 50/20* | (2021.01) |

(52) U.S. Cl.
CPC .............. *B60K 1/04* (2013.01); *B62D 21/02* (2013.01); *B62D 21/09* (2013.01); *B62D 25/08* (2013.01); *H01M 50/20* (2021.01); *B60K 2001/0438* (2013.01); *H01M 2220/20* (2013.01)

(58) Field of Classification Search
CPC ......... B60K 1/04; H01M 50/20; B62D 21/00; B62D 21/02; B62D 25/08
See application file for complete search history.

(56) References Cited

U.S. PATENT DOCUMENTS

| | | | | |
|---|---|---|---|---|
| 8,602,146 | B2 * | 12/2013 | Meyers ................. | H01M 50/20 180/68.5 |
| 8,708,401 | B2 * | 4/2014 | Lee ....................... | B62D 25/082 296/187.03 |
| 9,623,911 | B2 * | 4/2017 | Kano ..................... | B62D 25/12 |
| 9,708,006 | B2 * | 7/2017 | Schmalzrieth ......... | B62D 21/09 |

FOREIGN PATENT DOCUMENTS

JP          5411235          11/2013

* cited by examiner

*Primary Examiner* — James A Shriver, II
*Assistant Examiner* — James J Triggs
(74) *Attorney, Agent, or Firm* — David Coppiellie, Esq.; Carlson, Gaskey & Olds, P.C.

(57) ABSTRACT

A vehicle load management system includes, among other things, a traction battery mounted to an underbody structure of a vehicle, a rear subframe of the vehicle and a bushing sleeve of the rear subframe. The bushing sleeve has a convex outer surface. The system further includes a rear rail of the vehicle and a blocker that is disposed along a longitudinal axis of the vehicle between the bushing sleeve and at least a portion of the traction battery. The blocker has a concave surface adjacent the convex outer surface of the bushing sleeve.

20 Claims, 3 Drawing Sheets

VEHICLE LOAD MANAGEMENT SYSTEM AND METHOD

TECHNICAL FIELD

This disclosure relates generally to managing loads within a vehicle and, more particularly, to managing loads so that movement of a subframe toward a traction battery of the vehicle is limited.

BACKGROUND

Vehicles can include structures designed to, in part, manage the kinematics of vehicle structures when a load is applied to the vehicle. Electrified vehicles that include a traction battery can require managing the kinematics of structures around the traction battery.

SUMMARY

A vehicle load management system according to an exemplary aspect of the present disclosure includes, among other things, a traction battery mounted to an underbody structure of a vehicle, a rear subframe of the vehicle, and a bushing sleeve of the rear subframe. The bushing sleeve has a convex outer surface. The system further includes a rear rail of the vehicle and a blocker that is disposed along a longitudinal axis of the vehicle between the bushing sleeve and at least a portion of the traction battery. The blocker has a concave surface adjacent the convex outer surface of the bushing sleeve.

In another example of the foregoing system, the concave surface of the blocker is configured to contact the bushing sleeve when a load causes the rear subframe and the traction battery to move closer along the longitudinal axis.

In another example of any of the foregoing systems, the concave surface of the blocker mimics the convex outer surface of the bushing sleeve.

In another example of any of the foregoing systems, the convex outer surface of the bushing sleeve is configured to contact the concave surface of the blocker to transfer energy when a load that exceeds a threshold load is applied to a rear of the vehicle.

In another example of any of the foregoing systems, the blocker is a downward extension of the rear rail.

In another example of any of the foregoing systems, the blocker is a continuous, monolithic portion of the rear rail.

In another example of any of the foregoing systems, the blocker is a cast aluminum blocker that is part of the rear rail.

Another example of any of the foregoing systems includes a bushing and a mechanical fastener. The bushing is disposed within the bushing sleeve. The mechanical fastener extends through the bushing and the bushing sleeve to engage the rear rail and secure the rear subframe relative to the rear rail.

In another example of any of the foregoing systems, the bushing sleeve includes a cylindrical opening that receives the bushing.

Another example of any of the foregoing systems includes a bracket secured to the rear subframe and the blocker.

In another example of any of the foregoing systems, the bracket is disposed against a downwardly facing surface of the bushing sleeve and a downwardly facing surface of the blocker.

In another example of any of the foregoing systems, the downwardly facing surface of the bushing sleeve and the downwardly facing surface of the blocker are vertically aligned with each other.

In another example of any of the foregoing systems, the bracket is secured to the rear subframe with one mechanical fastener, and the bracket is secured to the blocker with more than one mechanical fastener.

In another example of any of the foregoing systems, the blocker and the bushing sleeve are forward a rear wheel axle of the vehicle.

In another example of any of the foregoing systems, the vehicle is an electrified vehicle.

A vehicle load management system according to another exemplary aspect of the present disclosure includes, among other things, a traction battery mounted to an underbody structure of a vehicle, a rear subframe of the vehicle, and a bushing sleeve of the rear subframe. The bushing sleeve has a convex outer surface. The system further includes a rear rail of the vehicle and a blocker that is disposed along a longitudinal axis of the vehicle between the bushing sleeve and at least a portion of the traction battery. The blocker a continuous, monolithic portion of the rear rail. The blocker a downward extension of the rear rail.

A vehicle load management method according to yet another exemplary aspect of the present disclosure includes, among other things, in an electrified vehicle, providing a blocker between a bushing sleeve of a rear subframe and at least a portion of a traction battery. The blocker has a concave surface adjacent the convex outer surface of the bushing sleeve. The bushing sleeve is configured to contact the convex outer surface to direct a load applied to a rear of the vehicle from the bushing sleeve to the blocker.

In another example of the foregoing method, the blocker is a continuous monolithic portion of the rear rail.

Another example of any of the foregoing systems includes securing a bracket adjacent to both a downwardly facing surface of the bushing sleeve and a downwardly facing surface of the blocker.

Another example of any of the foregoing methods includes inhibiting movement of the bushing sleeve toward the traction battery using the blocker.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details exemplary load management systems and methods that can help to manage and direct loads through an electrified vehicle. The systems and methods can, for example, help to limit movement of a subframe toward a traction battery pack when a load is applied to a rear of the electrified vehicle. The load can be due to another vehicle impacting the electrified vehicle, for example. As can be appreciated, the subframe contacting the traction battery pack can be undesirable.

Figure 1:
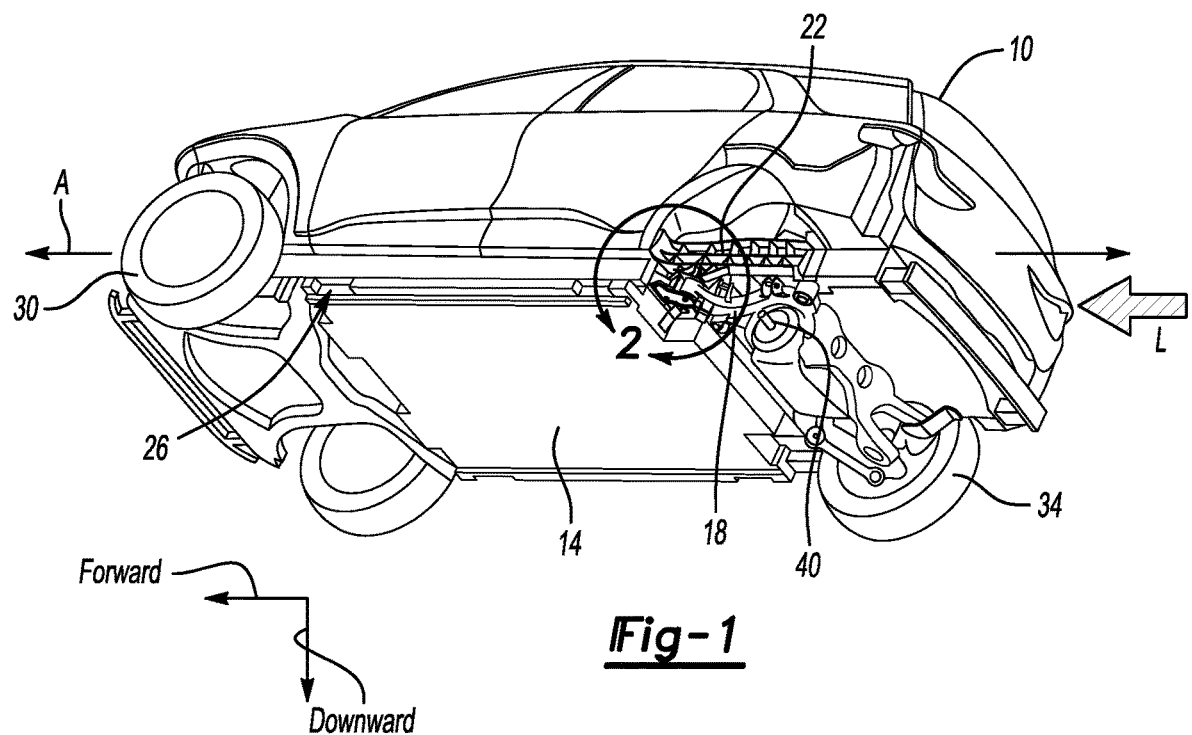
FIG. 1 illustrates a perspective view of an electrified vehicle having a load management system according to an exemplary aspect of the present disclosure.
Figure 2:
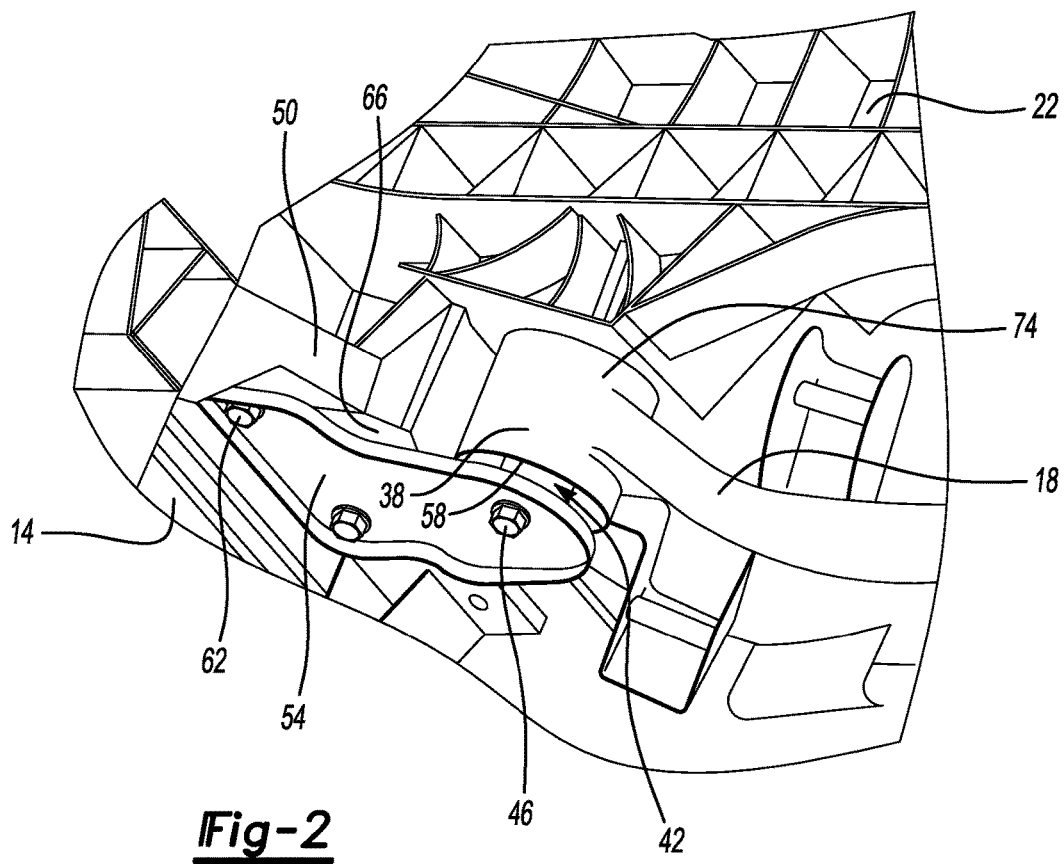
FIG. 2 illustrates a close-up view of a driver side area of the load management system of FIG. 1.
Figure 3:
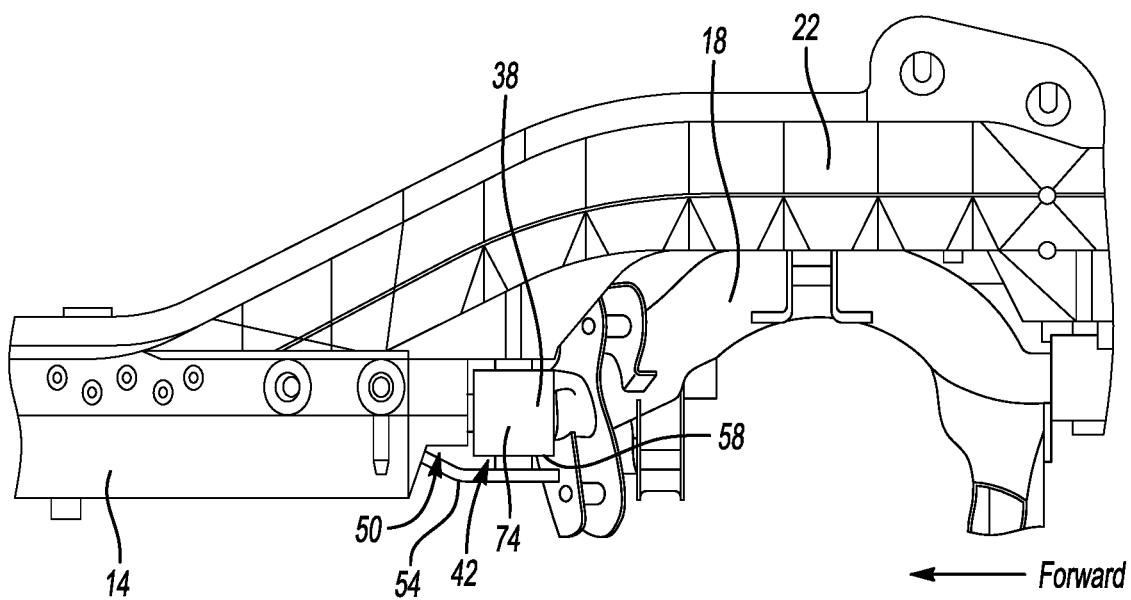
FIG. 3 illustrates a side view of a portion the load management system of FIG. 1.

With reference to FIGS. 1-3, an electrified vehicle 10 includes a traction battery 14, a rear subframe 18, and a rear rail 22. The traction battery 14 is mounted to an underbody structure 26 of the electrified vehicle 10 generally between front wheels 30 and rear wheels 34 of the electrified vehicle 10.

Electrified vehicles differ from conventional motor vehicles because electrified vehicles are selectively driven using one or more electric machines powered by a traction battery, such as the traction battery 14. Electric machines can drive wheels of the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

The exemplary traction battery 14 differs from a 12-Volt accessory battery because, among other things, the traction battery 14 can be used to provide motive power to drive the front wheels 30, the rear wheels 34, or both.

The rear subframe 18 is associated with the rear wheels 34 and is a rear subframe of the electrified vehicle 10. The rear subframe 18 is aft the traction battery 14 along a longitudinal axis A of the electrified vehicle 10.

The rear subframe 18 includes at least one bushing sleeve. FIGS. 2 and 3 show an exemplary bushing sleeve 38, which is a driver side bushing sleeve that is forward a rear wheel axle 40 of the electrified vehicle 10.

The bushing sleeve 38 provides a cylindrical opening or bore that receives a bushing 42. A mechanical fastener 46 can extend through the bushing 42 and the bushing sleeve 38 to threadably engage the rear rail 22 and to hold the rear subframe 18 relative to the electrified vehicle 10.

The rear rail 22 includes a blocker 50 that extends vertically downward from other portions of the rear rail 22. The blocker 50 is disposed along the longitudinal axis A of the electrified vehicle 10 between the bushing sleeve 38 and the traction battery 14. The blocker 50 is forward of the bushing sleeve 38, is directly in front of the bushing sleeve 38 in this example.

For purposes of this disclosure, downward and forward are with reference to the general orientation of the electrified vehicle 10 during ordinary operation of the vehicle.

In the exemplary embodiment, the blocker 50 is a continuous monolithic portion of the rear rail 22. The rear rail 22 can be a cast aluminum rear rail.

A bracket 54 is secured to the rear subframe 18 and the blocker 50 of the rear rail 22. In this example, the mechanical fastener 46 extends through an aperture in the bracket 54 to secure the bracket 54 adjacent a downwardly facing surface 58 of the bushing sleeve 38.

At least two other fasteners 62 secure the bracket 54 to a downwardly facing surface 66 of the blocker 50. The mechanical fasters 62 can threadably engage respective threaded bores within the blocker 50 to secure the bracket 54 to the downwardly facing surface 66 of the blocker 50. The downwardly facing surface 66 of the blocker 50 and the downwardly facing surface 58 of the bushing sleeve 38 are generally vertically aligned. That is, the bracket 54 does not attach to the rear rail 22 and then bend or step vertically downward to connect to the rear subframe 18.

Figure 4:
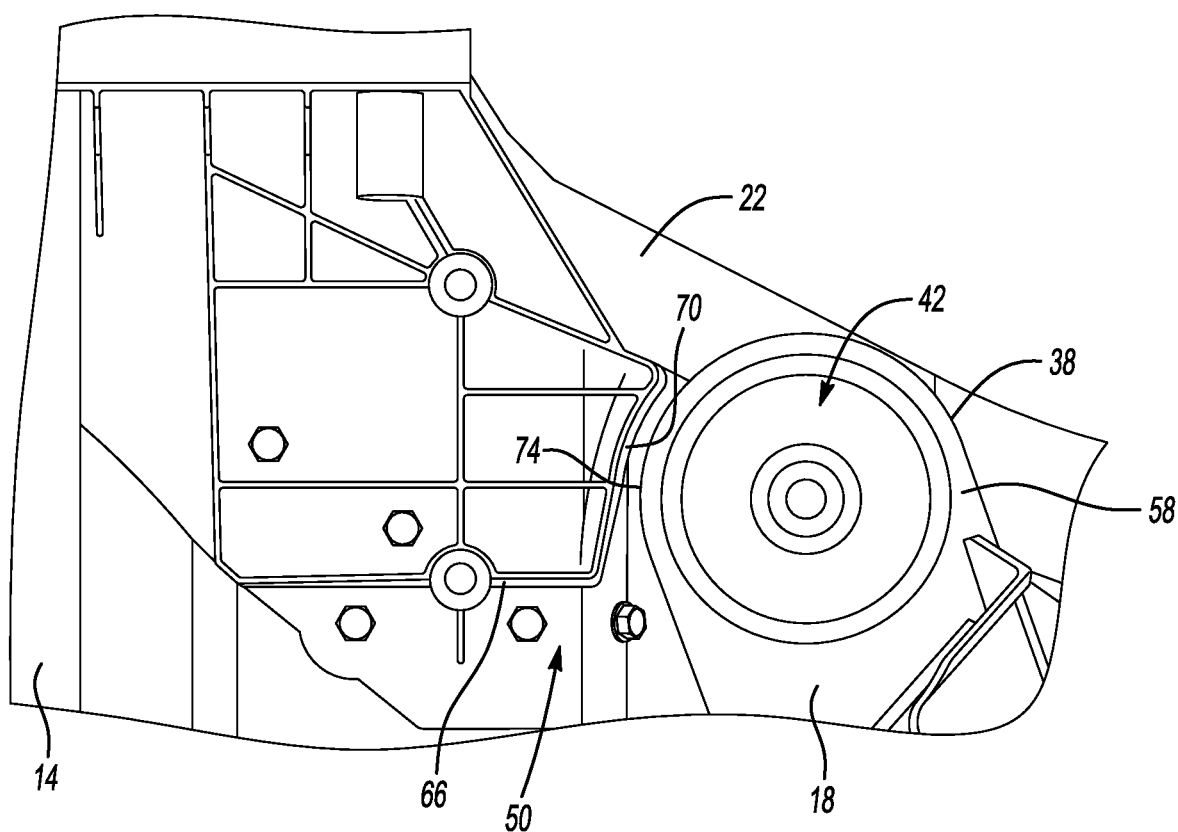
FIG. 4 shows a bottom view of the portion of the load management system shown in FIG. 3.
Figure 5:
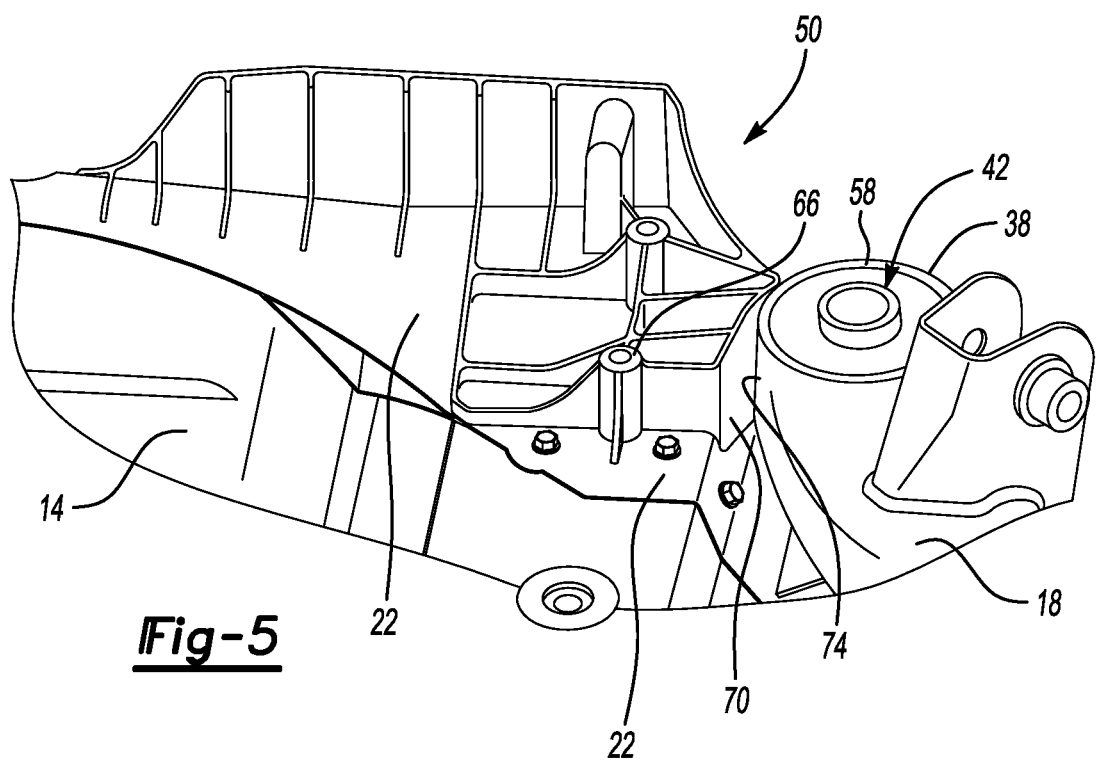
FIG. 5 shows a bottom, perspective view of the portion of the load management system shown in FIG. 3.

In FIGS. 4 and 5, the bracket 54 and fasteners 46, 62 are removed to show the downwardly facing surface 66 of the blocker 50 and the downwardly facing surface 58 of the bushing sleeve 38. The blocker 50 has a concave surface 70 that extends along a convex outer surface 74 of the bushing sleeve 38. Concave and convex are with reference to a vertically extending axis in this example.

During ordinary operation of the electrified vehicle 10, the concave surface 70 is adjacent to the convex outer surface 74 of the bushing sleeve 38, but spaced a distance from the convex outer surface 74 of the bushing sleeve 38. Over some of the concave surface, an arc of the concave surface 70 when viewed from below as shown in FIG. 4 generally tracks or mimics the arc of the convex outer surface 74.

When the bushing sleeve 38 is moved against the blocker 50, the concave surface 70 can help to keep the bushing sleeve 38 positioned against the blocker 50. Keeping the bushing sleeve 38 positioned against the blocker 50 can limit movement of the bushing sleeve 38 and rear subframe 18 toward the traction battery 14. If the concave surface 70 were omitted, the bushing sleeve 38, in the exemplary embodiment, could potentially slide outboard relative to the blocker 50 and slip forward past the blocker 50 toward the traction battery 14.

Figure 6:
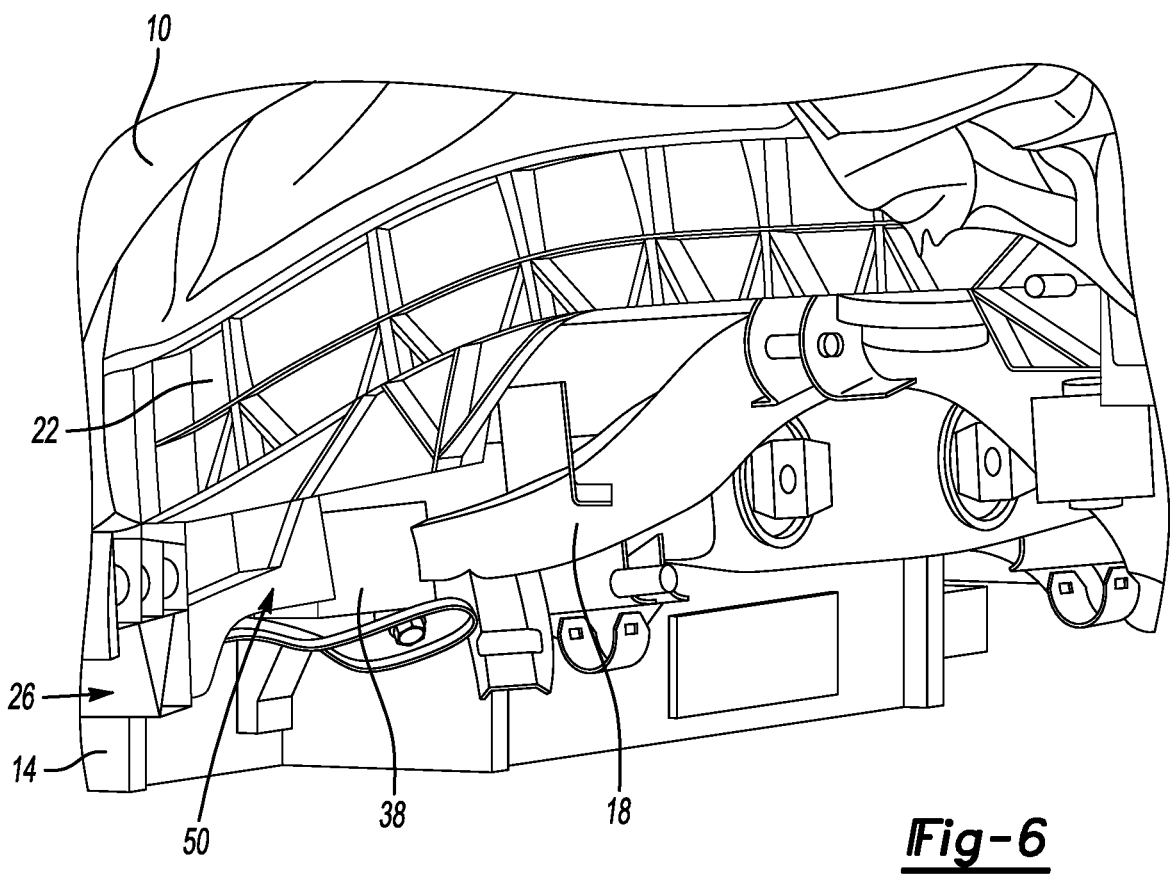
FIG. 6 shows a perspective view of the load management system of FIG. 1 after a load has been applied to a rear of the electrified vehicle.

FIG. 6 shows the rear subframe 18 after a load L (FIG. 1) above a threshold load has been applied to a rear of the electrified vehicle 10. The load L can be due to another vehicle impacting the rear of the electrified vehicle 10. As shown, the load L has pushed the rear subframe 18 forward toward the traction battery 14 of the electrified vehicle 10. The blocker 50 blocks the bushing sleeve 38 and other portions of the rear subframe 18 from moving forward enough to move against the traction battery 14, which could be undesirable.

The concave surface 70 of the blocker 50 helps the blocker 50 to "catch" the bushing sleeve 38. The convex outer surface 74 of the bushing sleeve 38 directly contacts the concave surface 70 of the blocker 50 due to the load L. Energy can then transfer from the bushing sleeve 38 to the blocker 50 and into the other portions of the rear rail 22 rather than the energy being transferred from the bushing sleeve 38 into the traction battery 14.

As can be appreciated, omitting the blocker 50 from the rear rail 22 would provide an open area between the bushing sleeve 38 of the rear subframe 18 and the traction battery 14 Thus, without the blocker 50, the load L could potentially drive the bushing sleeve 38 forward to a position where the bushing sleeve 38 contacts the traction battery 14. The blocker 50 thus inhibits movement of the bushing sleeve 38 toward the traction battery 14.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A vehicle load management system comprising:
   a traction battery mounted to an underbody structure of a vehicle;
   a rear subframe of the vehicle;
   a bushing sleeve of the rear subframe, the bushing sleeve having a convex outer surface;
   a rear rail of the vehicle; and
   a blocker that is disposed along a longitudinal axis of the vehicle between the bushing sleeve and at least a portion of the traction battery, the blocker having a concave surface adjacent the convex outer surface of the bushing sleeve.

2. The vehicle load management system of claim 1, wherein the concave surface of the blocker is configured to contact the bushing sleeve when a load causes the rear subframe and the traction battery to move closer along the longitudinal axis.

3. The vehicle load management system of claim 1, wherein the concave surface of the blocker mimics the convex outer surface of the bushing sleeve.

4. The vehicle load management system of claim 1, wherein the convex outer surface of the bushing sleeve is configured to contact the concave surface of the blocker to transfer energy when a load that exceeds a threshold load is applied to a rear of the vehicle.

5. The vehicle load management system of claim 1, wherein the blocker is a downward extension of the rear rail.

6. The vehicle load management system of claim 5, wherein the blocker is a continuous, monolithic portion of the rear rail.

7. The vehicle load management system of claim 1, wherein the blocker is a cast aluminum blocker that is part of the rear rail.

8. The vehicle load management system of claim 1, further comprising a bushing and a mechanical fastener, the bushing disposed within the bushing sleeve, the mechanical fastener extending through the bushing and the bushing sleeve to engage the rear rail and secure the rear subframe relative to the rear rail.

9. The vehicle load management system of claim 1, wherein the bushing sleeve includes a cylindrical opening that receives the bushing.

10. The vehicle load management system of claim 1, further comprising a bracket secured to the rear subframe and the blocker.

11. The vehicle load management system of claim 10, wherein the bracket is disposed against a downwardly facing surface of the bushing sleeve and a downwardly facing surface of the blocker.

12. The vehicle load management system of claim 11, wherein the downwardly facing surface of the bushing sleeve and the downwardly facing surface of the blocker are vertically aligned with each other.

13. The vehicle load management system of claim 10, wherein the bracket is secured to the rear subframe with one mechanical fastener, wherein the bracket is secured to the blocker with more than one mechanical fastener.

14. The vehicle load management system of claim 1, wherein the blocker and the bushing sleeve are forward a rear wheel axle of the vehicle.

15. The vehicle load management system of claim 1, wherein the vehicle is an electrified vehicle.

16. A vehicle load management system comprising:
    a traction battery mounted to an underbody structure of a vehicle;
    a rear subframe of the vehicle;
    a bushing sleeve of the rear subframe, the bushing sleeve having a convex outer surface;
    a rear rail of the vehicle; and
    a blocker that is disposed along a longitudinal axis of the vehicle between the bushing sleeve and at least a portion of the traction battery, the blocker is a continuous, monolithic portion of the rear rail, the blocker a downward extension of the rear rail.

17. A vehicle load management method, comprising:
    in an electrified vehicle, providing a blocker between a bushing sleeve of a rear subframe A and at least a portion of a traction battery, the blocker having a concave surface adjacent a convex outer surface of the bushing sleeve, the bushing sleeve configured to contact the convex outer surface to direct a load applied to a rear of the vehicle from the bushing sleeve to the blocker.

18. The vehicle load management method of claim 17, wherein the blocker is a continuous monolithic portion of the rear rail.

19. The vehicle load management method of claim 17, further comprising securing a bracket adjacent to both a downwardly facing surface of the bushing sleeve and a downwardly facing surface of the blocker.

20. The vehicle load management method of claim 17, further comprising inhibiting movement of the bushing sleeve toward the traction battery using the blocker.

* * * * *

UNITED STATES PATENT AND TRADEMARK OFFICE
CERTIFICATE OF CORRECTION

PATENT NO. : 11,192,437 B1
APPLICATION NO. : 16/937304
DATED : December 7, 2021
INVENTOR(S) : Edgar Butron Luz et al.

Page 1 of 1

It is certified that error appears in the above-identified patent and that said Letters Patent is hereby corrected as shown below:

In the Claims

In Claim 9, Column 5, Line 42; replace "the bushing" with --a bushing--

In Claim 17, Column 6, Line 32; replace "a rear subframe A" with --a rear subframe--

In Claim 18, Column 6, Line 41; replace "the rear rail" with --a rear rail--

Signed and Sealed this
Twenty-fifth Day of January, 2022

Drew Hirshfeld
*Performing the Functions and Duties of the*
*Under Secretary of Commerce for Intellectual Property and*
*Director of the United States Patent and Trademark Office*